L. C. MARTIN.
EYEGLASSES.
APPLICATION FILED SEPT. 11, 1916.
1,254,826.  Patented Jan. 29, 1918.
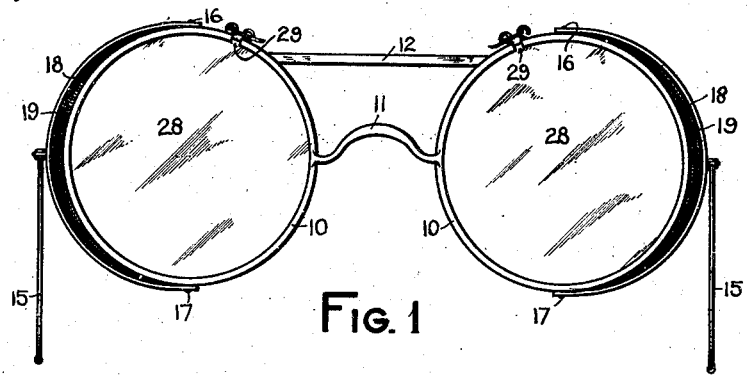
Fig. 1
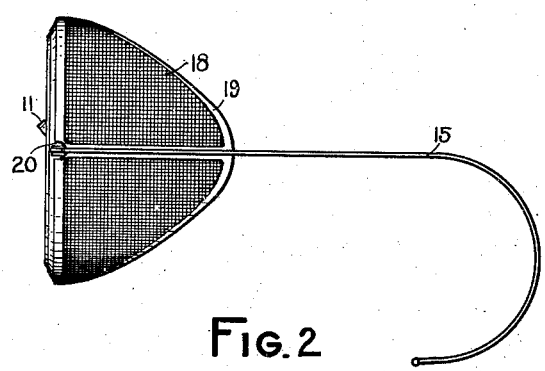
Fig. 2
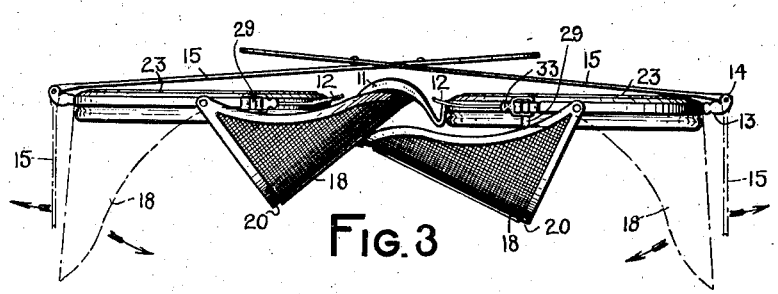
Fig. 3
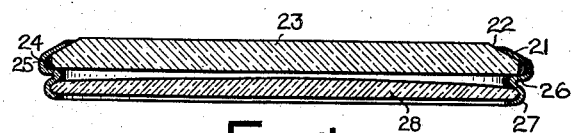
Fig. 4
Fig. 5
INVENTOR
Lawrence C. Martin
BY
ATTORNEYS

UNITED STATES PATENT OFFICE.

LAURENCE C. MARTIN, OF PROVIDENCE, RHODE ISLAND.

EYEGLASSES.

1,254,826.

Specification of Letters Patent.

Patented Jan. 29, 1918.

Application filed September 11, 1916. Serial No. 119,417.

*To all whom it may concern:*

Be it known that I, LAURENCE C. MARTIN, a citizen of the United States, and a resident of Providence, in the county of Providence and State of Rhode Island, have invented an Improvement in Eyeglasses, of which the following is a specification.

This invention relates to eyeglasses, and more particularly to eyeglasses of the protective type. One of the objects thereof is to provide a simple and inexpensive device of the above nature in which the parts are securely held and yet quickly and conveniently taken apart. Another object is to provide a practical device of the above nature in which errors of vision are readily corrected. Another object is to provide a support for an eyeglass lens of simple construction and reliable action. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawing, in which is shown one of various possible embodiments of this invention, Figure 1 is a rear view of the same in condition for use;

Fig. 2 is a side elevation of the parts shown in Fig. 1;

Fig. 3 is a plan view of the eyeglasses shown in Fig. 1 in folded condition, showing them in dotted lines in position for use;

Fig. 4 is a horizontal sectional view through an eyeglass lens and associated parts;

Fig. 5 is an enlarged detail elevation of a portion of an eyeglass rim showing the same sprung apart.

Similar reference characters refer to similar parts throughout the several views of the drawing.

Referring now in detail to this drawing, there is shown a pair of eyeglasses comprising the rims 10 connected by the bridge 11 and a cross bar 12 by which these rims are rigidly held in proper relation one to another. At the outer ends of the rims are the posts 13 to the forwardly inclined ends of which are pivoted at 14 the temple bars 15. These bars fold forwardly as indicated in full lines in Fig. 3 of the drawing, when the eyeglasses are in closed condition. It may here be noted that the term "eyeglasses" is used throughout in a broad sense to cover any device for mounting glasses before the eye.

Pivoted at 16 and 17 to each rim is a folding guard 18 preferably formed of a fine metallic screen bounded by a metal frame 19. These guards are so formed as to fold inwardly one upon the other, as indicated in Fig. 3 of the drawing, and when sprung outwardly to assume the position indicated in full lines in Figs. 1 and 2. The outward movement may be limited in any desired way and the guards may be recessed as at 20 to fit over the posts 13.

Considering now the construction of the individual rims, this is best shown in Fig. 4 of the drawing and it is to be understood that as these rims are identical, one only will be described in detail. The rim comprises an outer inclined flange 21, the angle of its inclination being substantially that of the bevel 22 at the edge of a protective lens 23. It is to be understood that by the term "protective lens" is meant any transparent member having such qualities as adapt it to resist the effect of a blow, and this is preferably formed of especially prepared glass having unusual strength and toughness. The lens 23 beyond its beveled surface 22 is preferably provided with a short cylindrical surface 24 which does not extend to the bottom of the channel 25 formed by the flange 21 and an inwardly directed portion 26 of the rim. In this manner, the rim will wedge itself into a tight and secure connection with protective lenses even though the latter be subject to variations in diameter or thickness.

The inner portion of the rim is so shaped as to form a channel 27 preferably of smaller diameter than the channel 25 and adapted to embrace and hold securely an optical lens 28. This lens may be of any desired form to correct errors of vision of the wearer, and is not only securely mounted in position but is thoroughly protected against breakage. Also, although it is not in itself in any sense a protective lens, nevertheless it contributes some slight element of security to the protection afforded by the member 23.

The rim 10 is preferably integral throughout except at the point 29 at which its ends meet and are secured one to another by a releasable catch. It may here be noted that the expression "releasable catch" is used to denote a device connected with one part and adapted to be moved into and out of interlocking relation to another part. This catch is preferably formed in the following manner. The rim, which is of resilient material and adapted readily to spring apart as indicated in Fig. 5 of the drawing, is provided at one end with a short extension which is rolled upon itself to form the post 30. A similar part upon the opposite end of the rim forms an eye 31 embracing a swinging link 32. This link, which is open and is provided with the short finger piece 33 shown in Fig. 3 of the drawing, is adapted to spring downwardly over the post 30 when the rim is drawn tightly over the lenses. The re-action of the rim and the form of the post 30 tend to lock the link 32 in position with its end lying as indicated in dotted lines at 34 in Fig. 5 of the drawing.

In the use of the device, the lenses 23 and 28 are placed within their respective channels in the rim with the latter sprung into the released or open form indicated in Fig. 5 of the drawing. The rim is then firmly drawn together over the lenses and the catch closed by springing the link over the post 30. The device is then in condition for use, the guards and temple bars being swung into the positions indicated in full lines in Figs. 1 and 2 of the drawing. The lenses, moreover, are not only snugly held in the face of variations in form, but are so positioned as to afford a maximum of protection. In the event that it is necessary to replace one of these lenses, no tools are required. Furthermore, there is no necessity for handling any delicate screws which require especial skill in their manipulation; an ordinary workman can spring open the releasable catch and substitute the lenses desired. It is to be noted, moreover, that the above and other advantages are gained not by an increase in the number of parts but rather with an actual diminution in this number and simplification of the entire device. Also the various parts with the exception of the lenses, are permanently secured one to another and the chance of losing any of them is thus obviated.

It will thus be seen that there is provided a device in which the several objects of this invention are achieved.

As various possible embodiments might be made of the above invention and as various changes might be made in the embodiment above set forth, it is to be understood that all matter herein set forth or shown in the accompanying drawing is to be interpreted as illustrative and not in a limiting sense.

I claim as my invention:

1. In eyeglass construction, in combination, a rim shaped to form a pair of channels, a protective lens formed of heavy glass constituted and adapted to resist the effect of a blow securely mounted in the forward channel, an optical lens mounted in the rear channel in parallel relation to said protective lens, and means adapted to hold the ends of said rim in position with the edges of said lenses closely embraced by said channels.

2. In eyeglass construction, in combination, a protective lens, a resilient rim embracing said lens, a protective device pivoted to the upper and lower portions of said rim and adapted to swing outwardly into a position extending rearwardly from the rim, a bridge connected with one side of said rim, and means securing the ends of said rim one to another at a point between said bridge and said pivotal connection with said protective device.

3. In eyeglass construction, in combination, a pair of rims, a bridge connecting said rims one to another, a pair of protective lenses respectively embraced by said rims, a pair of optical lenses respectively embraced by said rims, a pair of temple bars having respective pivotal connections with said rims and mounted to fold forwardly over said lenses, a pair of protective devices pivotally connected with said rims and adapted to swing inwardly over the rear portion of the lenses and outwardly into protecting position, and a pair of releasable catches respectively securing the ends of said rims in position about said lenses.

4. In eyeglass construction, in combination, a protective lens having a beveled edge and an extreme edge at a greater angle with the plane of the lens than said bevel, a rim forming a channel, the walls of which are at an angle substantially equal to that between the bevel surface of said lens and the opposite surface thereof, and means adapted to hold said rim tightly about said lens with its extreme edge surface out of contact with the bottom of said channel.

5. In eyeglass construction, in combination, a protective lens, an optical lens, a single device embracing the edges of said lenses and holding them substantially parallel, and a releasable catch securing the ends of said device one to another.

6. In eyeglass construction, in combination, a rim shaped to form a pair of channels, a protective lens mounted in the forward channel, an optical lens mounted in the rear channel, and a releasable catch securing the ends of said rim one to another.

7. In eyeglass construction, in combination, a rim forming a pair of channels, an optical lens embraced by the rear channel, a protective lens embraced by the forward channel, a protective device pivoted to said rim and adapted to spring outwardly into a position extending rearwardly therefrom, a temple bar pivotally connected with said rim, and a releasable catch securing the ends of said rim one to another, said rim being formed of sheet metal and being adapted to be sprung apart upon said catch being released to remove said lenses.

8. In eyeglass construction, in combination, a rim forming a channel, the walls of which diverge at a predetermined angle, a protective lens the edge portions of which converge as substantially said angle, the edge portion of said lens being shaped to fit snugly within said channel and out of contact with the bottom of said channel, and a releasable catch adapted to secure the ends of said rim one to another.

9. In eyeglass construction, in combination, a rim forming a channel, the walls of which diverge at a predetermined angle, a protective lens the edge portions of which converge at substantially said angle, the edge portion of said lens being shaped to fit snugly within said channel and out of contact with the bottom of said channel, a releasable catch adapted to secure the ends of said rim one to another, and an optical lens mounted within said rim at the rear of said protective lens.

In testimony whereof, I have signed my name to this specification this fifth day of September, 1916.

LAURENCE C. MARTIN.